US008029368B2

(12) United States Patent
Novis

(10) Patent No.: US 8,029,368 B2
(45) Date of Patent: Oct. 4, 2011

(54) METHOD OF ENTERTAINING USING A MOBILE ENTERTAINMENT ENVIRONMENT

(75) Inventor: Scott R. Novis, Tempe, AZ (US)

(73) Assignee: Game Truck Licensing, LLC, Tempe, AZ (US)

( * ) Notice: Subject to any disclaimer, the term of this patent is extended or adjusted under 35 U.S.C. 154(b) by 1088 days.

(21) Appl. No.: 11/880,715

(22) Filed: Jul. 24, 2007

(65) Prior Publication Data

US 2009/0029774 A1    Jan. 29, 2009

(51) Int. Cl.
*A63F 9/24* (2006.01)

(52) U.S. Cl. ..... 463/42; 463/40; 273/108.41; 273/148 R; 273/309; 273/460; 710/303

(58) Field of Classification Search ............ 463/16, 463/18, 20, 24, 36–40, 42, 46–47; 273/108.33, 273/108.41, 108.53, 108.55, 109, 118 A, 273/119 A, 120 A, 121 A, 121 B, 122 A, 273/123 A, 126 A, 138.2, 139, 148 B, 148 R, 273/150, 309, 406, 454–456, 460; 710/303; A63F 09/24
See application file for complete search history.

(56) References Cited

U.S. PATENT DOCUMENTS

| | | | | | |
|---|---|---|---|---|---|
| 3,765,133 | A | * | 10/1973 | Smothers | 52/7 |
| 4,110,792 | A | * | 8/1978 | Long et al. | 348/383 |
| 4,538,995 | A | * | 9/1985 | Fryer | 434/432 |
| 5,316,480 | A | * | 5/1994 | Ellsworth | 434/29 |
| 5,375,899 | A | * | 12/1994 | Wright | 296/21 |
| 5,393,074 | A | * | 2/1995 | Bear et al. | 273/440 |
| 5,398,463 | A | * | 3/1995 | Wright | 52/7 |
| 5,400,551 | A | * | 3/1995 | Uhl | 52/68 |
| 5,706,616 | A | * | 1/1998 | Fernandez | 52/143 |
| 5,865,624 | A | * | 2/1999 | Hayashigawa | 434/66 |
| 5,897,158 | A | * | 4/1999 | Henke et al. | 296/24.3 |

(Continued)

OTHER PUBLICATIONS

"Games on the Go", website, publication date unknown, http://www.gamesonthegoarcade.com/index.html (last visited Dec. 3, 2008).

(Continued)

*Primary Examiner* — Arthur O. Hall
(74) *Attorney, Agent, or Firm* — Etherton Law Group, LLC; Sandra L. Etherton

(57) ABSTRACT

A method for entertaining event attendees involves installing electronic equipment in a mobile entertainment environment and then transporting the mobile electronic environment to an event location. At the event location, event attendees are provided with temporary authorization and access to the mobile entertainment environment and subsequently entertained. At the conclusion of the entertainment, temporary authorization and access is revoked and the mobile electronic environment is removed from the event location. For storage, electronic equipment can be removed from the entertainment environment and placed in a secure location. The mobile entertainment environment preferably is a trailer pulled by a delivery vehicle, such as a pickup truck. The trailer has multiple entry points and contains comfortable seating for event attendees and multiple entertainment stations. At each entertainment station attendees can play games or watch DVDs using one of several gaming systems and their corresponding peripherals. Large video displays and audio equipment enhance the experience at each entertainment station. Interactive gaming can be experienced among multiple players at a single station, among players at different stations, or by connected to the internet for interactive play with remote players. Additional features of the entertainment environment include security cameras, exterior video displays for the benefit of attendees not in the trailer, stabilizers to minimize motion sickness within the trailer, and a video controller for providing master control of all of the video displays.

1 Claim, 2 Drawing Sheets

U.S. PATENT DOCUMENTS

| | | | |
|---|---|---|---|
| 6,155,928 | A | 12/2000 | Burdick |
| 6,289,637 | B1* | 9/2001 | Mendes, Jr. .................... 52/66 |
| 6,497,442 | B1* | 12/2002 | Wacker .................. 296/24.32 |
| 6,652,378 | B2* | 11/2003 | Cannon et al. ................ 463/20 |
| 6,783,164 | B2* | 8/2004 | Bortell .................. 296/24.33 |
| 6,997,495 | B1* | 2/2006 | Groezinger ............. 296/26.15 |
| 7,347,472 | B2* | 3/2008 | Pellegrin, Jr. ............ 296/24.38 |
| 7,353,396 | B2* | 4/2008 | Micali et al. ................. 713/176 |
| 7,716,486 | B2* | 5/2010 | Libin et al. .................. 713/176 |
| 7,794,001 | B2* | 9/2010 | Blackwell et al. ......... 296/24.38 |
| 2003/0216185 | A1* | 11/2003 | Varley ............................ 463/42 |
| 2004/0021552 | A1* | 2/2004 | Koo ........................... 340/5.53 |
| 2006/0143463 | A1* | 6/2006 | Ikeda et al. .................. 713/182 |
| 2006/0258446 | A1* | 11/2006 | Nguyen et al. ................. 463/30 |
| 2007/0070210 | A1* | 3/2007 | Piccionelli et al. ...... 348/211.11 |
| 2007/0155489 | A1* | 7/2007 | Beckley et al. ............... 463/29 |
| 2008/0234043 | A1* | 9/2008 | McCaskey et al. ............ 463/29 |

OTHER PUBLICATIONS

"Arcade Games", website, publication date unknown, http://www.gamesonthegoarcade.com/games.html (last visited Dec. 3, 2008).

"Frequently Asked", website, publication date unknown, http://www.gamesonthegoarcade.com/frequent.html (last visited Dec. 3, 2008).

"Photographs", website, publication date unknown, http://www.gamesonthegoarcade.com/photos/photo-01.html (last visited Dec. 3, 2008).

Business Wire News Release, Disney Interactive Takes on Learning on the Road With the Disney Big Rig Mobile Showroom (Aug. 10, 2000).

Press release, Sony Computer Entertainment America, Inc. Mobile PlayStation Videogame Arcade Brings Fun and Entertainment to Your Neighborhood (Jun. 3, 2005).

* cited by examiner

METHOD OF ENTERTAINING USING A MOBILE ENTERTAINMENT ENVIRONMENT

FIELD OF INVENTION

This invention relates to providing a social gaming and entertainment environment. This invention relates particularly to a method for entertaining event attendees by supplying a mobile entertainment environment equipped with multiple interchangeable gaming systems.

BACKGROUND

Video games have continued to evolve in terms of technology, popularity, and availability. This evolution is particularly evident in the market for console video game systems (referred to as "console systems" herein), which are stand-alone apparatuses designed primarily for video gaming. Pioneered by companies such as Atari® and Nintendo®, the console system market is highly competitive and consumers often fiercely loyal. One of the primary keys of technical development has been the ability for video game players to play against each other, as they could do in the arcade. The first Nintendo® console system allowed two video game players to interact simultaneously by providing two separate controllers and two controller ports on the console system. Capacity was soon expanded to four controllers on the next generation of console systems. Subsequently, Microsoft® introduced the Xbox®, which could be linked by cable to another Xbox®, allowing up to eight players to play against each other. With the advent and widespread adoption of the internet and computer networking, it became possible to host a video game on a central computer and allow players to interact remotely by accessing the central computer to play against each other. This capability was commercially expanded to the console market with the Xbox® and Xbox Live® service.

Graphical display capabilities, computer speed, and sophistication of game functionality have also matured, leading to a maturation of the market's target audience. Video games, once thought to be for kids, are widely played by youth, teens, and adults alike. For example, sports games such as EA Sports® Madden® football series have earned a following that supports yearly releases of new versions, nationwide tournaments, professional athlete endorsement contracts, and annual sales reaching into the tens of millions of dollars. The video gaming industry has further expanded its reach into other systems, such as televisions connected to DVD players, personal computers (PCs) that play DVDs, and PCs that connect to the internet. These systems, console systems, and other apparatuses used for video gaming such as joystick game devices are referred to herein collectively as gaming systems.

The widespread familiarity with gaming systems combined with the capacity for entertaining many people simultaneously makes console video gaming an attractive source of entertainment at many types of events and gatherings. However, because a single gaming system can only support a limited number of game controllers, typically four, the full potential of gaming systems in an event environment can only be attained by linking multiple gaming systems at the event. Providing multiple gaming systems becomes cost-prohibitive, as new generation gaming systems can cost $400 or more. The cost of additional game controllers, additional video displays (such as an LCD or plasma monitor or television), and a wide variety of video games to be played further drives the expense to an unreasonable level. Further, the event location must have a room or other space dedicated to video gaming. If the event is held outdoors, the environment may be unsuitable for both gamers and equipment due to lack of power requirements, air conditioning, or protection from the elements.

Event planners could mitigate the costs of providing gaming system entertainment by renting the gaming systems and video games. Video rentals stores such as Blockbuster® provide a limited number of console systems and video games for rental. However, this approach leaves some disadvantages unaddressed. For example, an event planner still must provide ample seating and a sufficient number of video displays. Furthermore, an event planner must install the equipment at each event, which requires time and technical knowledge, especially where the games are linked so multiple players can interact. Finally, an event planner must find a dedicated indoor or protected space at each event that can accommodate multiple displays, gaming systems, and players. It would therefore be desirable to have a method of renting video gaming systems and games where the renter could additionally rent space, seating, and display units. Moreover, it would be desirable to decrease the time and effort of setting up the gaming systems, seating and displays at each independent event.

Therefore, it is an object of this invention to provide a fully integrated multi-user mobile entertainment environment in which gamers can play individually or interactively on commercially popular video gaming systems. It is a further object that the mobile entertainment environment be comfortable and safe and able to entertain a plurality of gamers at a time. Another object of the invention is to provide a method in which gaming entertainment is provided temporarily by temporarily allowing access to a mobile entertainment environment. Another object of the invention is to provide a multi-user mobile entertainment environment that diminishes excessive noise, fumes, and obstructions and can safely and legally travel on public streets and through neighborhoods without the need for a commercial driver's license. Finally, a further object of the invention is to provide a multi-user entertainment environment where certain electronic components can be easily removed for secure storage when the entertainment environment is not in use.

SUMMARY OF THE INVENTION

This invention is a method for entertaining event attendees by installing electronic equipment in a mobile entertainment environment and then transporting the mobile electronic environment to an event location. At the event location, event attendees are provided with temporary authorization and access to the mobile entertainment environment and subsequently entertained. At the conclusion of the entertainment, temporary authorization and access is revoked and the mobile electronic environment is removed from the event location. For storage, electronic equipment can be removed from the entertainment environment and placed in a secure location. The mobile entertainment environment preferably is a trailer pulled by a delivery vehicle, such as a pickup truck. The trailer has multiple entry points and contains comfortable seating for event attendees and multiple entertainment stations. At each entertainment station attendees can play games or watch DVDs using one of several gaming systems and their corresponding peripherals. Large video displays and audio equipment enhance the experience at each entertainment station. Interactive gaming can be experienced among multiple players at a single station, among players at different stations, or by connected to the internet for interactive play with remote players. Additional features of the entertainment environment include security cameras, exterior video displays for the benefit of attendees not in the trailer, stabilizers to minimize motion sickness within the trailer, and a video controller for providing master control of all of the video displays.

DETAILED DESCRIPTION OF THE INVENTION

Figure 1:
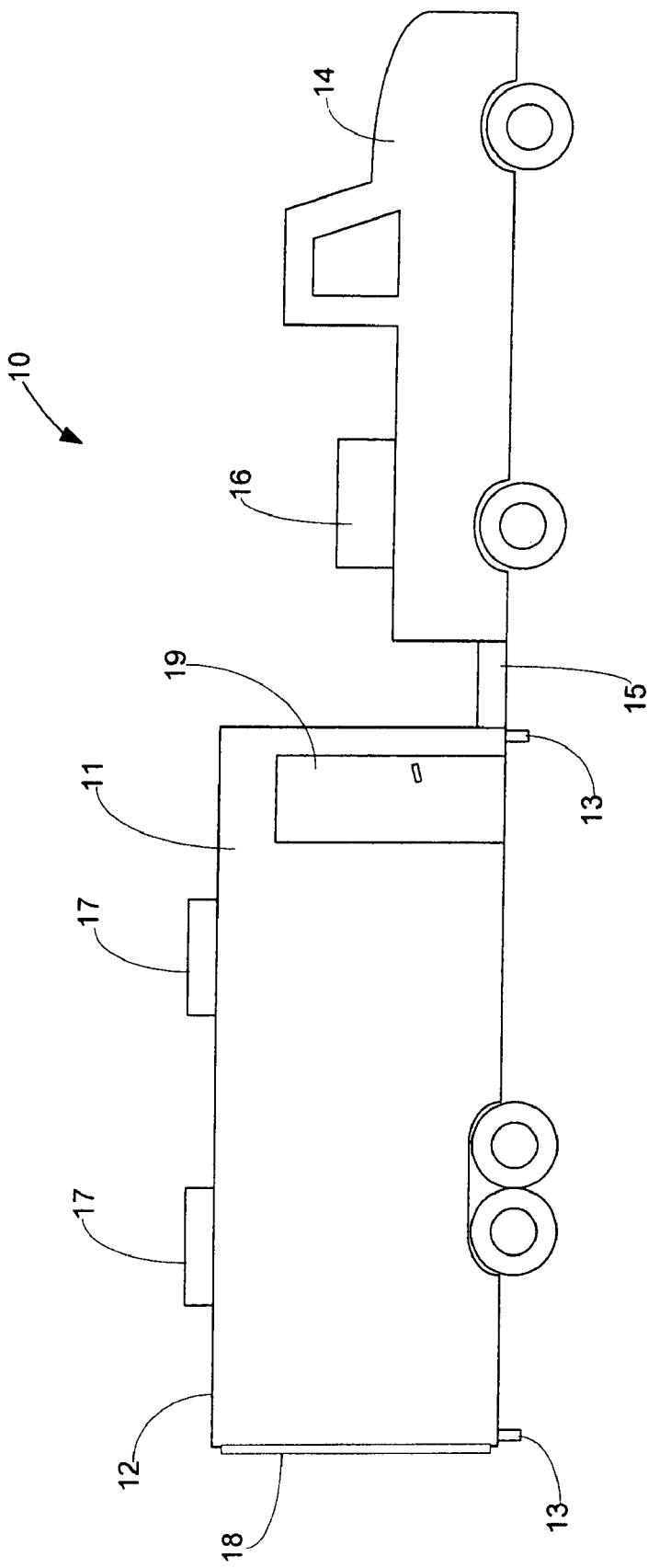
FIG. 1 is a side view of the preferred embodiment of the mobile entertainment environment of the present invention.

This invention is a method of entertaining event attendees by providing them with temporary access to a mobile entertainment environment. FIG. 1 illustrates the preferred embodiment of the mobile entertainment environment 10. Entertainment environment 10 preferably comprises enclosure 11 that can be transported to any event location by a delivery vehicle 14. Preferably, enclosure 11 is a trailer 24 feet long and 8.5 feet wide. A trailer of this size maximizes the amount of usable entertainment space while remaining within acceptable size guidelines for safely and easily driving on public streets without needing to obtain a special permit. Additionally, because the trailer is relatively light and does not haul any people, a commercial driver's license is not required. While an enclosure such as a trailer of this size is preferred, any environment is acceptable as long as it is capable of being mobile and accommodating the entertainment features as described below. For example, the entertainment environment could be a trolley, an open-air trailer, a platform, a truck with integral cabin and enclosed bed, a bus or any other mobile environment as is known in the art. In the preferred embodiment, enclosure 11 simply attaches to the hitch 15 of vehicle 14. While a detachable delivery vehicle is preferred, for some embodiments of the present invention, the ability to transport the environment may be integral with the enclosure 11 as, for example, when enclosure 11 comprises a bus or trolley. If a separate delivery vehicle is used, it is not limited to a pickup truck; any vehicle capable of towing a trailer can be used, as is known in the art.

Using a pickup truck is advantageous, however, because additional equipment for supporting entertainment environment 10 can be transported as well. For example, entertainment environment includes a power supply, which is preferably one or more gas-powered generators 16. FIG. 1 shows the generators 16 in the bed of delivery vehicle 14, but generators 16 can also be incorporated into or supported by enclosure 11. In the preferred embodiment, entertainment environment 10 includes three Honda® generators which provide over 10 kW of power without creating excessive noise.

Additionally, enclosure 11 can support one or more climate control units such as air conditioners 17 positioned on the roof 12 of enclosure 11, as is also shown in FIG. 1. The climate control units are used to regulate the temperature within enclosure 11 and can be air conditioners, heaters, fans dehumidifiers, or even simply windows, as is known in the art. By placing the air conditioners on the roof 12 of enclosure 11 and orienting them to blow on the entertainment stations 20, air is directed sideways onto the electronics and seating within enclosure 11 as opposed to down the length of enclosure 11. Climate control units can be positioned elsewhere on enclosure 11, however, as is known in the art.

Enclosure 11 preferably has one or more entry locations to accommodate event attendees and to facilitate the traffic flow of event attendees. FIG. 1 shows the preferred entry point: a curbside door 19 on one side of enclosure 11. Optionally, the enclosure 11 may include a door 18 that folds down to become a ramp at the back of enclosure 11. Any number of entry points can be used, however. Because door 18 folds down into a large ramp, it accommodates both large groups of attendees and wheelchairs. Additionally, it further helps control the climate and the atmosphere within enclosure 11. For example, for a more open feeling or for more airflow, door 18 can remain open during the entertainment period. Alternatively, for a more intimate theatre setting, door 18 and curbside door 19 can be closed. Windows with curtains or blinds can be placed around the enclosure as well for a similar effect, as is known in the art.

Finally, FIG. 1 shows stabilizers 13 positioned at each corner of enclosure 11. Stabilizers 13 can be lowered and used to prevent excessive motion or vibration when event attendees occupy the entertainment environment. Because the camera "views" of video games can induce actual motion sickness, stabilizers enhance the comfort of the event attendees. In the preferred embodiment, at least four hydraulic stabilizer are used, one near each corner of the enclosure. The stabilizers preferably act independently of the other. Alternatively, pneumatic or mechanical stabilizers may be used, such as screw-type stabilizers.

Figure 2:
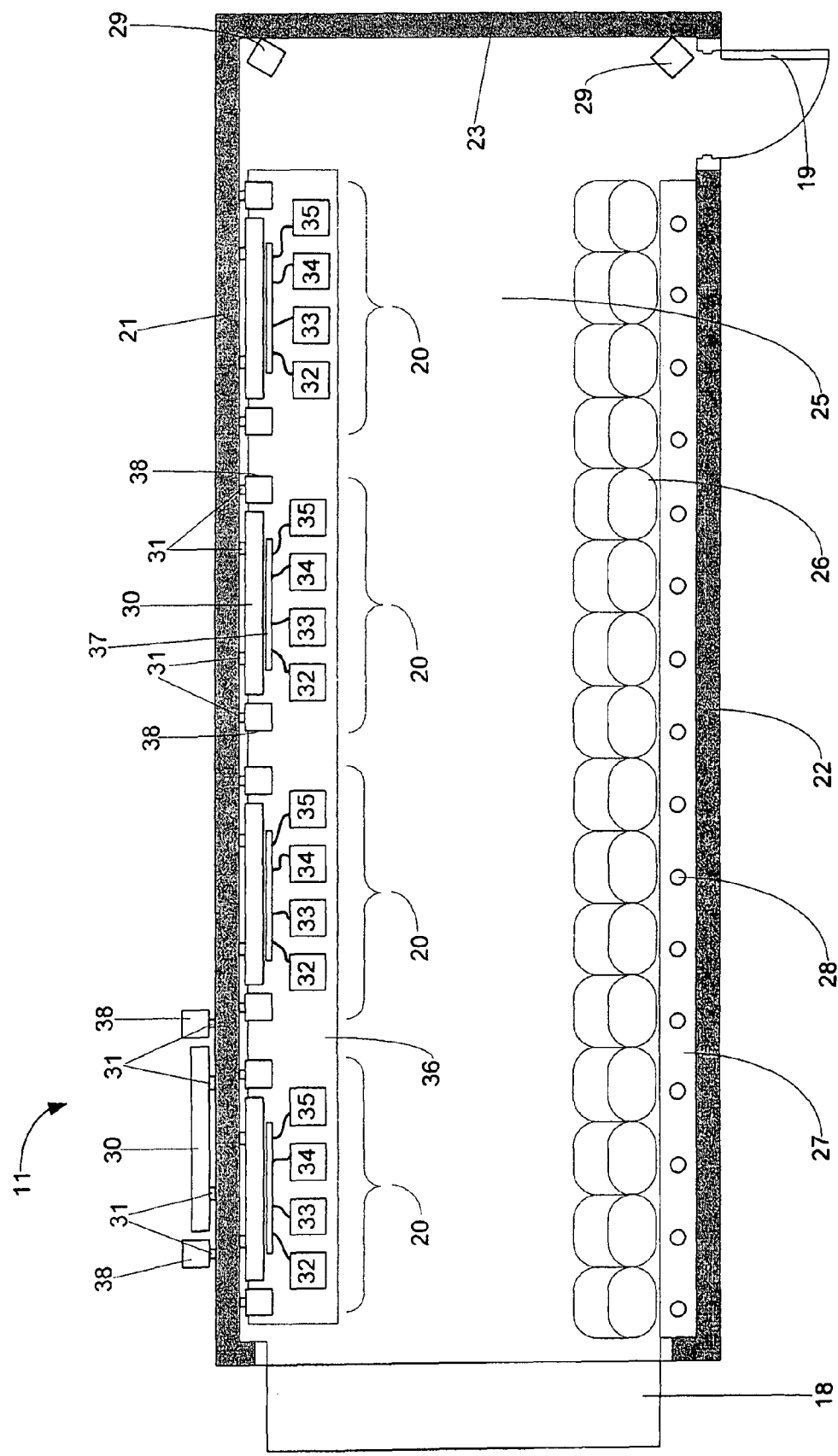
FIG. 2 is a top view of the preferred layout of the components of the mobile entertainment enclosure of the present invention.

FIG. 2 illustrates further details of enclosure 11 and its entertainment components. As shown in FIG. 2, enclosure 11 has sidewalls 21 and 22 and a front-end wall 23, which is near where enclosure 11 connects to delivery vehicle 14. At the back end of enclosure 11 is door 18. Preferably the floor 25 of enclosure 11 is insulated to increase the thermal and sound insulation performance of enclosure 11. For example, a layer of ½ inch construction foam under carpet will suffice.

Preferably sidewall 21 is reinforced with steel plates welded to the frame of enclosure 11. The steel plates can support one or more visual displays 30 and various audio components 38. Brackets 31 such as the type typically used to support wall hangings in earthquake-prone geographic areas are mechanically secured to the steel plates for supporting the electronics. Brackets 31 enable visual displays 30 and audio components 38 to be removed easily when the entertainment environment 10 is not in use. By enabling removal of the expensive electronics equipment, these components can be safely and securely stored thereby reducing insurance costs. While earthquake brackets are described, any type of bracket or support can be used as long as it secures the equipment during transport and enables equipment removal and installation.

A collection of components is used to play a video game, including the gaming system 32, one or more game controllers or other peripherals (not shown), a video display 30 and optionally a network hub 37. The components are referred to herein collectively as an entertainment station 20. The preferred embodiment of the present invention has four entertainment stations 20. The preferred embodiment uses one or more types of gaming systems, such as a dedicated DVD player 31, an Xbox® console system 32, a Playstation® console system 33, and a Wii® console system 34. Alternatively, other gaming systems or joystick games can be substituted, as will be readily apparent to someone skilled in the art. The controllers may be sired or wireless.

Each gaming system electrically connects to a generator 16, video display 30, and optionally audio components 38 associated with that particular entertainment station. Additionally, gaming systems 31, 32, 33 and 34 may electrically connect to a network hub 37 with system switches to easily switch from one gaming system to another. Finally, gaming systems 31, 32, 33 and 34 may also electrically connect to computer equipment and communications equipment for accessing the internet and to facilitate interactive gaming among event attendees and with remote game players. There are several methods for connecting the gaming systems to the internet. Preferably all four gaming systems connect over CAT5 twisted pair wires to a single hub, which is then connected to the internet. Alternatively the gaming systems can connect, either singly or ganged, via a wireless router to a remote existing internet connection, such as a broadband Wi-Fi connection. Another method is to connect the gaming systems using a high speed 3rd generation wireless cellular modem. Preferably the internet connection would be shared via a laptop or wireless router with Network Address Translation (NAT) capabilities.

In the preferred embodiment, multiple types of gaming systems may be used at each entertainment station 20 so that multiple types of games may be played. FIG. 2 shows four gaming systems 32, 33, 34, 35 at each entertainment station 20. In such case, the gaming systems are preferably interconnected with a network hub 37 at each entertainment station 20 to make it easy to switch between the games. The network hub 37 and system switches provide the flexibility to change gaming systems and games quickly and enables the entertainment environment to appeal for multiple types and tastes of event attendees. Alternatively, a single set of multiple gaming stations may be utilized in the entertainment environment, the gaming stations interconnected with a network hub 37 that transmits a desired game to each of the video displays 30.

Preferably each of the gaming systems is removable so that it can be removed for cleaning, replacement, or to be stored securely. More preferably, each of the gaming systems is interchangeable with the others, so that a gaming system can be easily swapped between each entertainment station 20.

Wall 21 supports four video displays 30, one at each of the four entertainment stations 20. Alternatively, the video displays may be posted on stanchions. Each video display 30 preferably provides a high definition, full viewing experience. Fifty-inch high-definition plasma televisions are preferable because they provide maximum performance given the enclosure's spatial limitations. Each video display 30 may be separately controlled by its respective gaming system, or multiple video displays 30 may be interconnected so that the same image is shown on each video display. In another embodiment in which the video displays 30 are interconnected, a single image is displayed across all four video displays. In another embodiment of enclosure 11, additional video displays 30 can be placed on the exterior of enclosure 11. Theses video displays 30 are also removably secured to steel-plate reinforced wall 21 with brackets 31. These exterior-mounted video displays allow other event attendees to either watch the games played, watch the event attendees in the enclosure, or watch DVDs or television events to further enhance the mobile entertainment environment.

Yet another embodiment of the present invention may further include a video amplifier or controller that is electrically connected to some or all of the video displays. The video controller allows event planners, party facilitators or others to control some or all the video displays to show messages, to simultaneously provide training videos or demonstrations on multiple visual display units, or to display a single game on multiple visual display units. Additionally, the video controller enables quick termination of entertainment when an event is concluded.

The game controllers (not shown) used to play the video games include a joystick, steering wheel, paddle, gun, keyboard, mouse, or Wii Remote as known in the art.

Optionally, at each entertainment station 20 along wall 21 there is a game shelf 36, which supports the gaming systems, their controllers and peripherals, multiple copies of a wide variety of games, a variety of movies or shows on DVDs, any supportive computer equipment, multiple power outlets, and one or more network hubs 37 that permits easy switching of gaming systems and allow players to dynamically add and delete players. Game shelf 36 can be one long shelf that spans the length of wall 21 or it can be smaller shelves, cabinets, tables, drawers or any other type of storage unit. Housed in or on game shelf 36 at each station is one or more gaming system.

The entertainment environment 10 includes seating for event attendees. Preferably the seating comprises removable chairs or sofas. The seating is preferably placed opposite the video displays for optimal viewing. For example, four entertainment stations can sit across from seating for sixteen attendees. Preferably, there are three six-foot couches that can seat up to sixteen event attendees. Because the seating is removable, portions can be removed if necessary to accurate wheelchairs or to be cleaned or replaced. While six-foot couches are preferred, any type of seating can be used, as is known in the art, such as recliners or captains chairs.

Behind seating 26, in the preferred embodiment, there is a long food and beverage shelf 27. Food and beverage shelf 27 can be any type of storage or shelving and may even have integral cup holders 28 to minimize spills. Alternatively, the food and beverage shelves can be integral with the seating. In addition to providing a convenient place for event attendees to place their food and beverages while they are playing games, the food and beverage shelf 27 also provides additional insulation and helps conceal irregularities in the floor caused by the wheels of enclosure 11.

In one embodiment of enclosure 11, security cameras 29 can be included to allow for real-time viewing of event attendees by parents, party facilitators, or other event attendees. For example, the cameras 29 can transmit images either to a television located in a parent's house or to additional video displays set up externally to enclosure 11. Security cameras 29 may record event activities for later review, for example in case any damage or injury occurs during a party.

Entertainment environment 10 can be used to entertain or educate attendees at a wide variety of events including birthday parties, graduation parties, client entertainment events, corporate training sessions, team celebrations, video game tournaments, sports training analysis sessions, or fund raisers. Young children can be entertained with simple games and educational shows. Teenagers and older children can be entertained with a wide variety of interactive games. Professionals can use the entertainment environment 10 for gaming, for entertaining clients, or for training sessions. Ultimately, the entertainment environment is a cost-effective way for event planners to deliver a total gaming and entertainment experience with minimal financial investment and no technical expertise.

In use, prior to delivering the entertainment environment to an event location, the certain electronics equipment can be taken from a secure storage area and installed in enclosure 11. Installation includes positioning the equipment and electrically connecting some or all of the components to each other. For example, the video displays 30 and the gaming systems 31, 32, 33 and 34 can be electrically connected and secured in enclosure 11. Once the equipment is in the enclosure, the entire entertainment environment is transported to the event location. Upon arrival at the event site, entertainment environment is positioned in a relatively level or flat location and the stabilizers 13 are lowered. Then, any equipment that has not already been placed or electrically connected previously can now be placed and connected. For example, the power source can be connected to the climate control units. Once the environment is set up, the desired doors are opened and temporary authorization to use entertainment environment 10 is granted to the event attendees. Preferably the temporary authorization is arranged prior to delivering the entertainment enclosure 11 to an event, and more preferably the temporary authorization is provided for a fee. The fee may be a flat fee for a given event, or variable, based on the time at the event, number of event attendees, or other method of calculating the fee. For large events, multiple entertainment enclosures 11 may be delivered and use temporarily authorized.

When the event attendees enter enclosure 11, they can find comfortable seats at one of the entertainment stations. At each entertainment station, the event attendees can choose the gaming system they prefer to use and choose a game to play or a show to watch. If desired, the event attendees can play an interactive game with other attendees at their station or they can link to another station for even more interactive gaming. Moreover, they can choose to connect to the internet and play interactive games with remote game players. While having temporary authorization to use entertainment environment 10, the event attendees can change among games and gaming systems as they wish.

If exterior video displays are desired, they are preferably installed once entertainment environment 10 arrives at the event location. Once they are installed, additional event attendees can watch what the games or movies being played inside enclosure 11, or they can watch security camera images or other videos or television broadcasts.

At the conclusion of the event, when the temporary authorization expires, any exterior video displays 30 are removed and the entire environment 10 is driven away from the event location. Once back to its usual storage location, the certain electronic components can be disconnected and removed from the environment 10 for secure storage.

While there has been illustrated and described what is at present considered to be the preferred embodiment of the present invention, it will be understood by those skilled in the art that various changes and modifications may be made and equivalents may be substituted for elements thereof without departing from the true scope of the invention. Therefore, it is intended that this invention not be limited to the particular embodiment disclosed, but that the invention will include all embodiments falling within the scope of the appended claims.

I claim:

1. A method of entertaining event attendees, the method comprising:
   a) providing a mobile entertainment environment comprising a first entertainment station and a second entertainment station;
   b) installing a first removable gaming system having a first display in the first entertainment station, wherein the first removable gaming system is configured to be removed from the first entertainment station;
   c) installing a second removable gaming system having a second display in the second entertainment station, wherein the second removable gaming system is configured to be removed from the second entertainment station and is connected to the first removable gaming system over a network;
   d) transporting the mobile entertainment environment to an event location;
   e) providing first, second, and third event attendees with temporary authorization, using one or more entry points, to access the mobile entertainment environment;
   f) entertaining the first, second and third event attendees, the entertaining comprising:
   i. enabling at least the first event attendee using a first controller to play a first game on the first removable gaming system, wherein the first game is displayed on the first display; and
   ii. enabling at least the second event attendee using a second controller to play a second game on the second removable gaming system while the first event attendee using the first controller is playing the first game on the first removable gaming system wherein the second game is displayed on the second display; and
   iii. enabling the first and third event attendees using the first controller and a third controller, respectively, to play the first game with each other on the first removable gaming system; and
   iv. enabling the first and third event attendees using the first and third controllers, respectively, to play the second game on the first removable gaming system with the second event attendee while the second event attendee uses the second controller on the second removable gaming system; and
   g) terminating access when the temporary authorization expires.

* * * * *

UNITED STATES PATENT AND TRADEMARK OFFICE
CERTIFICATE OF CORRECTION

PATENT NO. : 8,029,368 B2
APPLICATION NO. : 11/880715
DATED : October 4, 2011
INVENTOR(S) : Scott R. Novis Page 1 of 1

It is certified that error appears in the above-identified patent and that said Letters Patent is hereby corrected as shown below:

Column 4, line 67 the reference numerals "31, 32, 33 and 34" should be changed to "32, 33, 34, and 35".

Column 5, line 3 the reference numerals "31, 32, 33 and 34" should be changed to "32, 33, 34, and 35".

Column 6, line 65 the reference numerals "31, 32, 33 and 34" should be changed to "32, 33, 34, and 35".

Signed and Sealed this
Fifteenth Day of May, 2012

David J. Kappos
*Director of the United States Patent and Trademark Office*